(12) United States Patent
Hane

(10) Patent No.: US 8,188,421 B2
(45) Date of Patent: May 29, 2012

(54) OPTICAL ENCODER FOR DETECTING THE RELATIVE DISPLACEMENT BETWEEN AN ENCODER SCALE AND AN ENCODER HEAD

(75) Inventor: Jun Hane, Tokyo (JP)

(73) Assignee: Olympus Corporation, Tokyo (JP)

( * ) Notice: Subject to any disclaimer, the term of this patent is extended or adjusted under 35 U.S.C. 154(b) by 293 days.

(21) Appl. No.: 12/726,674

(22) Filed: Mar. 18, 2010

(65) Prior Publication Data

US 2010/0243871 A1 Sep. 30, 2010

(30) Foreign Application Priority Data

Mar. 26, 2009 (JP) ................. 2009-076819

(51) Int. Cl.
*G01D 5/34* (2006.01)
(52) U.S. Cl. ................. 250/231.14; 250/237 G; 356/617
(58) Field of Classification Search ............. 250/231.13–231.18, 237 G, 237 R; 356/616, 617; 341/11, 13, 31
See application file for complete search history.

(56) References Cited

U.S. PATENT DOCUMENTS

| 6,486,467 | B1 * | 11/2002 | Speckbacher et al. ..... 250/237 G |
| 6,603,114 | B1 * | 8/2003 | Holzapfel et al. ........ 250/231.14 |
| 7,242,484 | B2 * | 7/2007 | Shirley .................... 356/604 |
| 7,435,945 | B2 * | 10/2008 | Shimomura et al. ..... 250/231.13 |

FOREIGN PATENT DOCUMENTS

JP  6-221874  8/1994

* cited by examiner

*Primary Examiner* — Seung C Sohn
(74) *Attorney, Agent, or Firm* — Scully, Scott, Murphy & Presser, P.C.

(57) ABSTRACT

An optical encoder comprises an encoder head and a scale having a second grating that has an optical pattern. The encoder head has a light emission unit to emit specific light to the scale, a light transmission member to transmit the light emitted from the light emission unit and a light detection unit having light detection elements arranged at a predetermined pitch. The light transmission member has a first grating having an optical pattern of a predetermined pitch and an aperture to narrow the light emitted from the light emission unit and impinging on the second grating of the scale. A motion of an image on the light detection elements of the light detection unit is detected. The image is formed by the light reflected or diffracted by the second grating of the scale after the light impinges on the scale through the light transmission member.

30 Claims, 5 Drawing Sheets

OPTICAL ENCODER FOR DETECTING THE RELATIVE DISPLACEMENT BETWEEN AN ENCODER SCALE AND AN ENCODER HEAD

CROSS-REFERENCE TO RELATED APPLICATIONS

This application is based upon and claims the benefit of priority from prior Japanese Patent Application No. 2009-076819, filed Mar. 26, 2009, the entire contents of which are incorporated herein by reference.

BACKGROUND OF THE INVENTION

1. Field of the Invention

The present invention relates to an optical encoder designed to detect the relative displacement between an encoder scale and an encoder head.

2. Description of the Related Art

In recent years, to miniaturize optical encoders and lower their manufacturing cost, with regard to encoder head shape, can-package light sources and light-receiving elements have been replaced by bare-chip or surface mounting types or have been encapsulated in clear mold resin.

Further, the light-receiving element is covered with or encapsulated in a light transmission member such as clear mold resin. Moreover, both the light-emitting element and the light-receiving element are encapsulated together.

For example, in the optical encoder of FIG. 10, which is disclosed in Jpn. Pat. Appln. KOKAI Publication No. 6-221874, the light-emitting element 8 and the light-detecting element 12 are sealed in a transparent capsule 2 made of epoxy resin or the like. The transparent capsule 2 has two lenses 40 and 41 on the surface. The light emitted from the light-emitting element 8 directly impinges on a code wheel 34 that has a reflecting region 30 and a non-reflecting region 32. The light reflected from the code wheel 34 is detected by the light-detecting element 12.

BRIEF SUMMARY OF THE INVENTION

An optical encoder according to a first aspect of this invention comprises:

an encoder head secured to one of a fixed member and a movable member which move relative to each other; and a scale secured to the other of the fixed member and movable member, facing the encoder head and having a second grating that has an optical pattern of a predetermined pitch, wherein:

the encoder head has a light emission unit configured to emit specific light to the scale, a light transmission member configured to transmit the light emitted from the light emission unit and a light detection unit having light detection elements arranged at a predetermined pitch;

the light transmission member has a first grating having an optical pattern of a predetermined pitch and an aperture configured to narrow the light emitted from the light emission unit and impinging on the second grating of the scale; and a motion of an image on the light detection elements of the light detection unit is detected, the image being formed by the light reflected or diffracted by the second grating of the scale after the light emitted from the light emission unit impinges on the scale through the light transmission member.

An optical encoder according to a second aspect of the invention is a modification of the optical encoder according to the first aspect. In the modification, the first grating is formed on that surface of the light transmission member, which faces the light emission unit or the scale, and a pattern of the aperture is formed on the other surface of the light transmission member.

An optical encoder according to a third aspect of the invention is a modification of the optical encoder according to the second aspect. In the modification, the first grating is formed on that surface of the light transmission member, which faces the light emission unit, and a pattern of the aperture is formed on that surface of the light transmission member, which faces the scale.

An optical encoder according to a fourth aspect of the invention is a modification of the optical encoder according to the first aspect. In this modification, the pattern of the first grating functions as the aperture.

An optical encoder according to a fifth aspect of the invention is a modification of the optical encoder according to the fourth aspect. In this modification, the optical pattern of the first grating is formed on that surface of the light transmission member, which faces the light emission unit or the scale, and functions as the aperture, and a pattern of a second aperture is formed on the other surface of the light transmission member.

An optical encoder according to a sixth aspect of the invention is a modification of the optical encoder according to the first aspect. In the modification, the light transmission member is mounted directly on that surface of the light emission unit, which faces the scale.

An optical encoder according to a seventh aspect of the invention is a modification of the optical encoder according to the first aspect. In the modification, the light transmission member is mounted directly on that surface of the light detection unit, which faces the scale.

An optical encoder according to an eighth aspect of the invention is a modification of the optical encoder according to the first aspect. In this modification, the pattern of the aperture is circular or at least part of the pattern is arcuate.

An optical encoder according to a ninth aspect of the invention is a modification of the optical encoder according to the first aspect. In the modification, a light transmission hindering unit is provided on at least parts of the sides of the light transmission member.

An optical encoder according to a tenth aspect of the invention is a modification of the optical encoder according to the first aspect. In the modification, the pattern of the aperture is formed on that surface of the light transmission member, which faces the scale.

An optical encoder according to an eleventh aspect of this invention is a modification of the optical encoder according to the first aspect. In the modification, the pattern of the aperture is formed on that surface of the light transmission member, which faces the light emission unit.

An optical encoder according to a twelfth aspect of the invention is a modification of the optical encoder according to the first aspect. In the modification, the optical encoder is a reflecting type.

An optical encoder according to a thirteenth aspect of the invention is a modification of the optical encoder according to the first aspect. In the modification, those surfaces of the light emission unit and light detection unit, which face the scale, are entirely covered by a second light transmission member.

An optical encoder according to a fourteenth aspect of the invention is a modification of the optical encoder according to the first aspect. In the modification, those surfaces of the light emission unit and light detection unit, which face the scale, are entirely covered by a second light transmission member; the upper surface of the second light emission member is almost flat; and the following relation is satisfied in terms of the distance converted assuming that the refractive indices of intervening light transmission members such as the first light transmission member are the same as that of the second light transmission member: ArcTan $\{L/(t1+t2)\} \geq$ ArcSin(n1/n2) where t1 is the distance from the light emission unit to the surface of the second light transmission member, t2 is the distance from the light detection unit to the surface of the second light transmission member, L is a component of the longest distance between the light emission unit and the light detection unit, the component being parallel to the surface of the scale, n1 is the refractive index outside the encoder, and n2 is the refractive index of the light transmission member.

An optical encoder according to a fifteenth aspect of the invention is a modification of the optical encoder according to the first aspect. In the modification, the light transmission member extends toward the light detection unit.

An optical encoder according to a sixteenth aspect of the invention comprises:

an encoder head secured to one of a fixed member and a movable member which move relative to each other; and a scale secured to the other of the fixed member and movable member, facing the encoder head and having a second grating that has an optical pattern of a predetermined pitch, wherein:

the encoder head has a light emission unit configured to emit specific light to the scale, a light transmission member configured to transmit the light emitted from the light emission unit and a light detection unit that has a third grating having an optical pattern of a predetermined pitch;

the light transmission member has a first grating having an optical pattern of a predetermined pitch and an aperture configured to narrow the light emitted from the light emission unit and impinging on the second grating of the scale; and a motion of an image on the third grating of the light detection unit is detected, the image being formed by the light reflected or diffracted by the second grating of the scale after the light emitted from the light emission unit impinges on the scale through the light transmission member.

An optical encoder according to a seventeenth aspect of the invention is a modification of the optical encoder according to the sixteenth aspect. In the modification, the first grating is formed on that surface of the light transmission member, which faces the light emission unit or the scale, and a pattern of the aperture is formed on the other surface of the light transmission member.

An optical encoder according to an eighteenth aspect of the invention is a modification of the optical encoder according to the seventeenth aspect. In this modification, the first grating is formed on that surface of the light transmission member, which faces the light emission unit, and a pattern of the aperture is formed on that surface of the light transmission member, which faces the scale.

An optical encoder according to a nineteenth aspect of the invention is a modification of the optical encoder according to the sixteenth aspect. In the modification, the pattern of the first grating functions as the aperture.

An optical encoder according to a twentieth aspect of the invention is a modification of the optical encoder according to the nineteenth aspect. In the modification, the optical pattern of the first grating is formed on that surface of the light transmission member, which faces the light emission unit or the scale, and functions as the aperture, and a pattern of a second aperture is formed on the other surface of the light transmission member.

An optical encoder according to a twenty-first aspect of the invention is a modification of the optical encoder according to the sixteenth aspect. In this modification, the light transmission member is mounted directly on that surface of the light emission unit, which faces the scale.

An optical encoder according to a twenty-second aspect of the invention is a modification of the optical encoder according to the sixteenth aspect. In this modification, the light transmission member is mounted directly on that surface of the light detection unit, which faces the scale.

An optical encoder according to a twenty-third aspect of the invention is a modification of the optical encoder according to the sixteenth aspect. In the modification, the pattern of the aperture is circular or at least part of the pattern is arcuate.

An optical encoder according to a twenty-fourth aspect of the invention is a modification of the optical encoder according to the sixteenth aspect. In the modification, a light transmission hindering unit is provided on at least parts of the sides of the light transmission member.

An optical encoder according to a twenty-fifth aspect of the invention is a modification of the optical encoder according to the sixteenth aspect. In this modification, the pattern of the aperture is formed on that surface of the light transmission member, which faces the scale.

An optical encoder according to a twenty-sixth aspect of the invention is a modification of the optical encoder according to the sixteenth aspect. In the modification, the optical encoder is a reflecting type.

An optical encoder according to a twenty-seventh aspect of the invention is a modification of the optical encoder according to the sixteenth aspect. In the modification, those surfaces of the light emission unit and light detection unit, which face the scale, are entirely covered by a second light transmission member.

An optical encoder according to a twenty-eighth aspect of the invention is a modification of the optical encoder according to the sixteenth aspect. In this modification, those surfaces of the light emission unit and light detection unit, which face the scale, are entirely covered by a second light transmission member; the upper surface of the second light transmission member is almost flat; and the following relation is satisfied in terms of the distance converted assuming that the refractive indices of intervening light transmission members such as the first light transmission member are the same as that of the second light transmission member: ArcTan $\{L/(t1+t2)\} \geq$ ArcSin(n1/n2) where t1 is the distance from the light emission unit to the surface of the second light transmission member, t2 is the distance from the light detection unit to the surface of the second light transmission member, L is a component of the longest distance between the light emission unit and the light detection unit, the component being parallel to the surface of the scale, n1 is the refractive index outside the encoder, and n2 is the refractive index of the light transmission member.

An optical encoder according to a twenty-ninth aspect of the invention is a modification of the optical encoder according to the sixteenth aspect. In the modification, the light transmission member extends toward the light detection unit.

An optical encoder according to a thirtieth aspect of the invention is a modification of the optical encoder according to the sixteenth aspect. In the modification, the light transmission member extends toward the light detection unit.

Objects and advantages of the invention will be set forth in the description which follows, and in part will be obvious from the description, or may be learned by practice of the invention. The objects and advantages of the invention may be realized and obtained by means of the instrumentarilites and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

An optical encoder according to a first embodiment of this invention will be described in detail, with reference to the accompanying drawings. It should be noted that this invention is not limited to the first embodiment. Although a combination of, for example, an encoder head and a linear scale is used in the first embodiment, a disk-shaped scale or a scale formed on a hollow cylinder can be used in this invention. If a linear scale is not used, the present invention can use a flat plate having an optical pattern of predetermined pitch or a plate formed by virtually extending this flat plate, on the assumption that the optical pattern provided on the scale on which light from a light source impinges to detect displacement is a flat plate as viewed microscopically and that the optical pattern has the predetermined pitch as viewed microscopically.

The optical encoder according to the first embodiment will be described below.

[Configuration]

Figure 1:
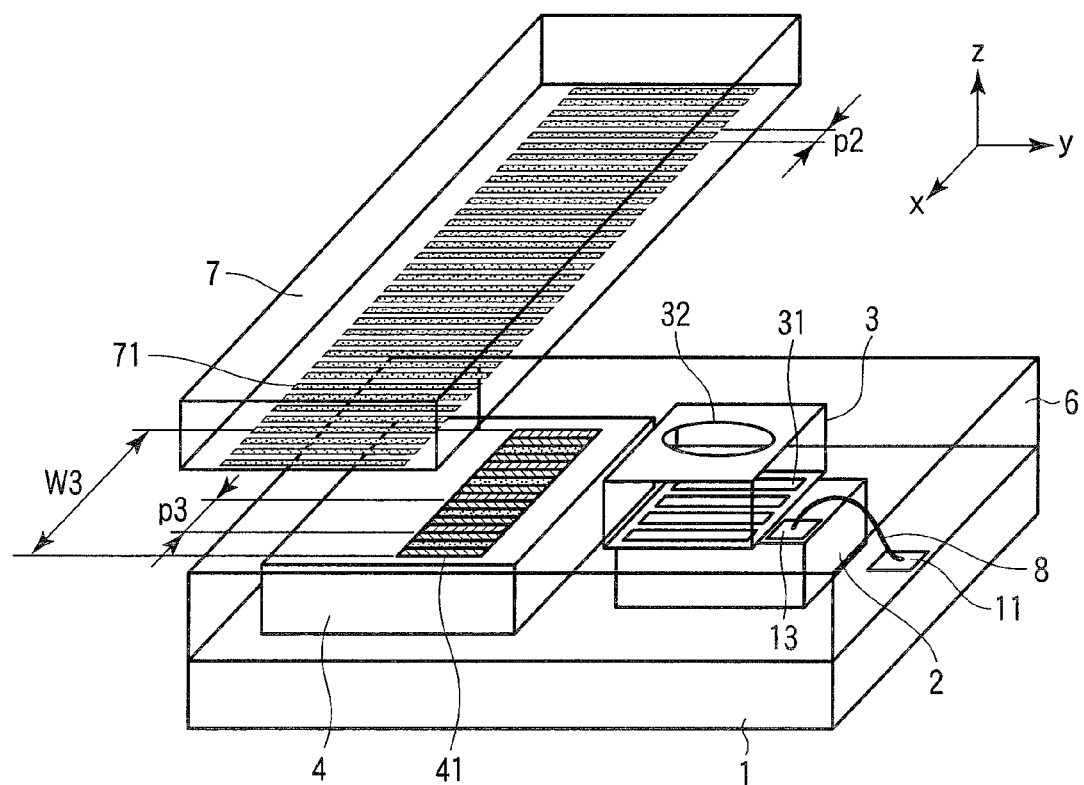
FIG. 1 is a perspective view of an optical encoder according to a first embodiment of the present invention.
Figure 2:
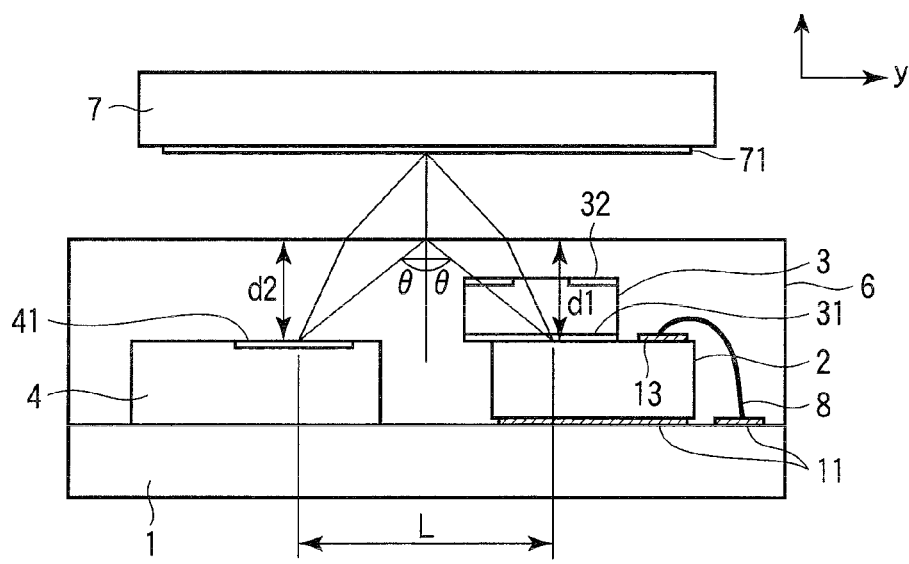
FIG. 2 is a sectional view of the optical encoder according to the first embodiment of this invention.

FIG. 1 is a perspective view of an optical encoder (hereinafter referred to simply as an "encoder") according to a first embodiment of this invention. FIG. 2 is a sectional view of the optical encoder. In any embodiment of the invention, the orthogonal coordinate system of X-, Y- and Z-axes are set as shown in the drawings. As FIG. 2 shows, the encoder comprises six major components, i.e., a substrate 1, a bare LED (or bare chip, hereinafter referred to simply as an LED) 2, a light transmission member 3, a photodetector 4, a light-transmitting resin layer 6, and a scale 7. The photodetector 4 has a PD array 41 having pitch p of ¾. The scale 7 has a second grating 71 having pitch p2. As shown in FIG. 1, the light transmission member 3 is mounted directly on that surface of the LED 2 as a light-emitting section, which faces the scale 7.

The substrate 1, LED 2 arranged on the substrate 1, light transmission member 3 arranged on and extending from the LED 2 in the x- and y-directions and photodetector 4 arranged on the substrate 1 are integrated, forming an encoder head. The upper part of this encoder head is entirely and altogether covered with the light-transmitting resin layer 6 that has refractive index n. That is, the encoder head is buried in the light-transmitting resin layer 6.

The light transmission member 3 has a first grating 31 having pitch p1, in the surface that faces the LED 2, and has a circular aperture 32 having radius R in the surface that faces the scale 7. That side of the light transmission member 3 which faces the photodetector 4 is shielded with a light transmission control member. The radius R of the aperture 32 has been determined to satisfy several conditions. The first condition is that the light emitted from the LED 2 and reflected at the inner surface of the light-transmitting resin layer 6 should be blocked and thereby prevented from directly impinging on the photodetector 4. The second condition is that the light should be incident on the inner surface of the light-transmitting resin layer 6 at almost the angle of total reflection, thus blocking the reflecting light. The third condition is that the light not serving at all or scarcely serving to detect encoder signals should be blocked. Of these conditions, the first condition that the light emitted from the LED 2 must be prevented from directly impinging on the photodetector 4, has the highest priority. The first condition may be combined with any other conditions to thereby determine the shape of the aperture 32. The aperture 32 may block even a signal that contributes to the detection of encoder signals. In this case, the aperture shape may be determined on the basis of the intensity and signal-to-noise ratio of encoder signals.

Figure 3A:
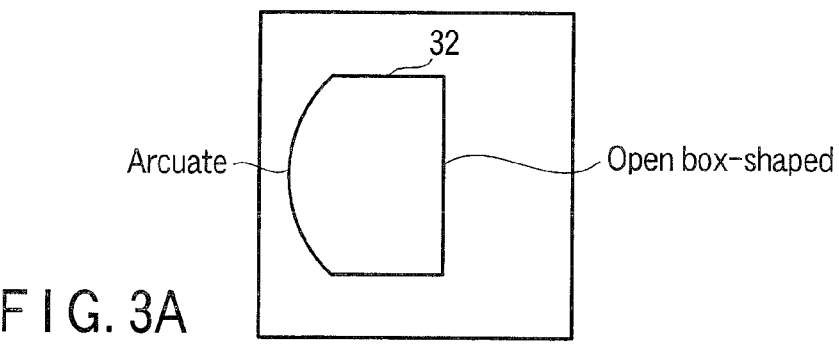
FIGS. 3A, 3B and 3C are diagrams showing various shapes the aperture may have in the optical encoder.

FIG. 3A shows a modified shape the aperture 32 may have. The left part of the aperture, which is close to the LED 2, remains arcuate. In contrast, the right part of the aperture is open box-shaped, blocking the light not contributing to detection. The straight vertical edge of the open box-shaped part is formed to block the light not reaching the light-receiving surface of the PD array 41. Moreover, the upper and lower straight edges of the open box-shaped part are formed to block the light deviating from the PD array in the x-direction.

As described above, that side of the light transmission member 3, which faces the photodetector 4, is shielded. This is for the purpose of blocking the light that the aperture 32 cannot block or the light that has been reflected at the aperture 32. That side of the member 3 need not be shielded if the necessary ones of the above-mentioned first to third conditions are satisfied at all. Further, the other side of the light transmission member 3 may also be shielded.

The PD array 41 is a combination of a third grating having pitch p3 and a light-receiving element. In this embodiment, every four PD array elements are arranged at pitch p3 and the outputs of these PD array elements are electrically connected in order to produce four signals that have a phase difference of 90°.

The first grating 31, second grating 71 and the light-receiving surface of the PD array 41 are arranged parallel to one another in the x-direction as shown in FIG. 1. That part of the upper surface of the resin layer, through which at least the light emitted from the LED 2 passes after reflected by the scale 7 and before reaching the photodetector 4, is formed flat and parallel to the three gratings. The scale 7 can be displaced in the x-direction only, relative to the encoder head, so that the second grating 71 can be parallel to the first grating 31 and the light-receiving surfaces of the PD array 41.

Moreover, the substrate 1, the LED 2, the light transmission member 3 and the photodetector 4 are shaped like flat plates and extend parallel to one another. The thickness tolerance for these components is about ±20 μm or less. As shown in FIGS. 1 and 2, the LED 2, the light transmission member 3 and the photodetector 4 are adhered, one on another, on the substrate 1. The thickness tolerance for the adhesive layers bonding these members together is about ±10 μm or less. Further, the light-transmitting resin layer 6 is so shaped that its upper surface is almost flat.

In the light transmission member 3, the first grating 31 is patterned on almost the entire one surface of the light transmission member 3. That is, as shown in FIG. 1, the first grating 31 is formed on that surface of the light transmission member 3, which faces the LED 2, and the aperture 32 is made in that side of the light transmission member 3, which faces the scale 7. Alternatively, the first grating may be formed on that side of the light transmission member 3, which faces the scale 7, and the aperture 32 is made in that surface of the light transmission member 3, which faces the LED 2.

As for the electrical wiring, the LED 2 and the photodetector 4 are electrically connected to the substrate 1. This enables the LED 2 and the photodetector 4 to operate. Electrodes are formed on the upper and lower surfaces of the LED 2, respectively. The upper electrode 13 and the electrode 11 on the substrate 1 are connected by a conductive wire 8. The lower electrode (not shown) and the electrode 11 on the substrate 1 are connected by conductive paste. The photodetector 4 and the substrate 1 are connected by a conductive wire, too. However, how they are connected will not be explained in detail.

(Operating Principle)

How the three-grating encoder operates will be explained with reference to various equations. The PD array is an integral unit composed of the third grating and the light-receiving element in the three-grating encoder. Hereinafter, the light-receiving surface of PD array will be called "third grating," wherever necessary and appropriate.

As is known in the art, an interference pattern having a cycle of pitch $p3i$ is formed on the third grating when the following conditional equations (i.e., Equations 1 and 2 are satisfied:

$$\frac{1}{z1} + \frac{1}{z2} = \frac{\lambda}{k \times (p2)^2}, k \text{ being a natural number} \quad (1)$$

where z1 is the optical distance between the first and second gratings, z2 is the optical distance between the second and third gratings, p1 is the pitch of the first grating, p2 is the pitch of the second grating, p3 is the pitch of the third grating, and λ is the wavelength of the light source. The term "optical distance" used here will be defined with reference to Equations 4 and 5, which will be given later.

The interference pattern has pitch $p3i$, which is expressed as:

$$p3i = \frac{z1+z2}{z1} \times p2 \quad (2)$$

Optimal signal detection can be achieved if the pitch p3 of the third grating is made equal to the pitch $p3i$ of the interference pattern, as shown below:

$$p3 = p3i \quad (3)$$

In this embodiment, the components have specific sizes and arranged at specific positions so that Equations 1 to 3 may be satisfied and an encoder signal may thereby be produced. All distances presented in the equations are optical distances. If all the optical paths exist in the atmosphere, the actual distances can be applied as optical distances. Usually, however, the encoder head is encapsulated in a package, and light therefore may pass through glass or light transmitting resin. In this case, "optical distance" is the sum of values that have been obtained by dividing the actual lengths of optical paths constituted by various media or space, respectively by the refractive indices of the respective media or space.

That is, the optical distance z1 between the first and second gratings, and the optical distance z2 between the second and third gratings, are given as follows:

$$z1 = \sum_i \frac{ti}{ni} \quad (4)$$

$$z2 = \sum_j \frac{tj}{nj} \quad (5)$$

wherein ni and ti are the refractive index and thickness of the ith media or space, respectively (i being a natural number) between the first and second gratings, and nj and tj are the refractive index and thickness of the jth media or space, respectively (j being a natural number) between the second and third gratings.

The thickness and refractive index of the media or space existing between the first and second gratings, and the thickness and refractive index of the media or space existing between the second and third gratings (light-receiving surface of the PD array) will be explained below.

As for the space between the first and second gratings, the light-transmitting substrate has refractive index n1 and thickness t1, the light-transmitting resin layer has refractive index n2 and thickness t2, and the air layer between the encoder head and the scale has refractive index n3 and thickness t3.

As for the space between the second and third gratings, the air layer between the encoder head and the scale has refractive index n3 and thickness t3 and the light-transmitting resin layer has refractive index n2 and thickness t5.

The light-transmitting substrate has a refractive index of about 1.5, the light-transmitting resin layer has a refractive index of about 1.5, and the air has a refractive index of about 1. The refractive indices of the light-transmitting substrate and light-transmitting resin layer are those of materials that can be relatively easy to obtain. Nonetheless, the light-transmitting substrate and the light-transmitting resin layer may have refractive indices of any other values.

In this setting, the optical distances z1 and z2 between the gratings are expressed as follows, by using Equations 4 and 5:

$$z1 = t1/n1 + t2/n2 + t3/n3$$

$$z2 = t5/n2 + t3/n3$$

The present embodiment is configured to establish the following equations:

$$z1 = z2 \quad (6)$$

$$p1 = p3 \quad (7)$$

From Equations 2, 3, 6 and 7, the following relationship holds for the pitch of the grating:

$$p1 = p3 = 2 \times p2$$

(Thus far explained is the operating principle of the three-grating encoder.)

The thickness of the encoder head will be explained. As for the space between the light-emitting surface of the LED 2 and the surface of the light-transmitting resin layer 6, the light transmission member 3 has refractive index n1 and thickness t1, the light-transmitting resin layer 6 has refractive index n2 and thickness t2. As for the space between the surface of the light-transmitting resin layer 6 and the PD array 41, the light-transmitting resin layer 6 has refractive index n2 and thickness t5. Note that the air layer between the encoder head and the scale has refractive index n3.

Distance d1 between the light-emitting surface of the LED 2 and the surface of the light-transmitting resin layer 6, and distance d2 between the light-transmitting resin layer 6 and the PD array 41 are defined as follows, in terms of the refractive index of the light-transmitting resin layer 6:

$$d1 = t1 \times n2/n1 + t2 \tag{8}$$

$$d2 = t5 \tag{9}$$

The angle of reflection θ at the surface of the light-transmitting resin layer 6 is given as follows:

$$\tan\theta = L/(d1+d2) \tag{10}$$

where L is the distance between the LED 2 used as a light source and the light-receiving part of the PD array 41, as measured in the direction parallel to the scale 7.

Further, the angle of total reflection θc at the surface of the light-transmitting resin layer 6 is given as follows:

$$\sin\theta c = n3/n2 \tag{11}$$

In this embodiment, the resin layer is thin in order to miniaturize the encoder. For this reason, the relationship between θ and θc satisfying Equation 12, below, is set, to the distance L longest from the light-emitting unit in the light-receiving area of the PD array 41. That is, the encoder is so configured that at least part of the reflected light is totally reflected to reach the light-receiving area of the PD array 41, if the light is internally reflected at the surface of the light-transmitting resin layer 6.

$$\theta \geq \theta c \tag{12}$$

From Equations 8 to 12, Equation 13, below, will hold:

$$\arctan\{L/(d1+d2)\} > \arcsin(n3/n2) \tag{13}$$

Note that each component of this embodiment can be modified and replaced by any other type. The LED used as a light source may be a bare-chip, molded or can-package type, so long as it can form a diffraction image like a surface emitting laser. The light transmission member 3 having the first grating is made of glass as in most cases. Nonetheless, it may be made of PET or resin such as polyimide. In this embodiment, the third grating, which is composing of array elements of four types different in detection phase, is used in the light-receiving unit. Instead, it may be composed of array elements of two types or one depending on the number of output signal required.

This embodiment is configured to detect relative displacement. Nevertheless, additional components for detecting the reference position, particularly a light source, a detection unit, an optical pattern, etc., can be arranged on the encoder head and the scale.

Moreover, the first to third gratings or some of them can be arranged, each in plurality, so that a plurality of detection systems may detect displacements in the same direction or orthogonal directions, at the same time.

[Operation]

How the configuration described above operates will be explained below. The LED 2 used as a light source emits light. The light passes through the first grating 31 formed on the light transmission member 3 and impinges on the second grating 71 provided on the scale 7. The light is reflected and diffracted by the second grating 71, forming a diffraction image of the second grating 71 on the PD array 41 (third grating). The diffraction image, which is an image magnified to twice the size of the second grating 71, is formed through the PD array 41 and detected by the photodetector 4. If the scale 7 moves in the x-direction, relative to the encoder head, the diffraction image will move on the third grating in the x-direction. As a result, the photodetector 4 produces cyclic pseudo-sinusoidal wave signals.

The photodetector 4 produces four signals, each having a phase difference of 90° with respect to any other signal. If necessary, a difference between two signal sets, each consisting of two signals having a phase difference of 90°, is acquired, thereby obtaining two signals that has a phase difference of 90°. The light emitted from LED 2, passing through the first grating 31 of the light transmission member 3 and reaching the upper surface of the light transmission member 3 is blocked by the aperture 32 and does not impinge directly on the photodetector 4. Depending on its shape, the aperture 32 can block almost all light totally or almost totally reflected at the surface of the light-transmitting resin layer 6, or can block the light that does not contribute to the detection of the encoder signal.

Particularly, if the aperture 32 is circular or has at least one arcuate part, the angle of incidence of the light reaching the light-transmitting resin layer 6 can be limited to a predetermined value or a smaller value.

Moreover, since that side of the light transmission member 3, which faces the photodetector 4, is shielded from light, the light internally reflected is prevented from travelling along the sides of the light transmission member 3 to reach directly to the photodetector 4. All sides of the light transmission member 3 may be shielded from light, or specific parts of the light transmission member 3 may be shielded from light. In either case, stray light can be reduced in the light-transmitting resin layer 6, or stray light travelling in a particular direction can be reduced.

[Advantages]

In the first embodiment described above, the aperture 32 prevents the light reflected in the light-transmitting resin layer 6 from directly impinging on the photodetector 4. The noise component contained in the encoder signal detected can therefore be reduced. This helps to increase the signal-to-noise ratio, ultimately accomplishing stable detection of signals. Since the aperture 32 is made in the light transmission member 3 that constitutes the first grating 31, additional members need not be used. Particularly in the optical path extending from the LED 2 used as a light source to the photodetector 4, the aperture 32 is made in the member (here, light transmission member 3) close to the LED 2 that has yet to diverge light. Hence, the area required for the aperture 32 can be small. This is desirable, also for the miniaturization of the encoder.

Since the light transmission member 3 is mounted directly on the surface of the LED 2 used as a light source, the area required for the aperture 32 can be small, and the size of the light transmission member 3 can be small, too. In addition, both the aperture 32 and the first grating 31 can easily perform their respective functions, because nothing is interposed between the LED 2 and the light transmission member 3 and the displacement of the components is small while being mounted.

The advantage resulting if the first grating 31 is provided at the LED 2 of the light transmission member 3, and the aperture 32 is provided at the scale 7, will be explained below. The optical distance from the first grating 31 to the second grating 71 is equal to the distance from the second grating 71 to the third grating. Therefore, the height of the PD array 41 can be smaller by the thickness of the light transmission member 3 than in the case where the first grating 31 is provided on that side of the light transmission member 3, which faces the scale 7. As a result, the entire encoder can be made thinner than otherwise. Moreover, since the steps are small, wires can be easily laid from the photodetector 4.

Further, the area required for forming the first grating 31 can be small, because the first grating 31 is arranged near the LED 2 used as a light source. This also helps to render the light transmission member 3 smaller.

The aperture 32 is provided in the upper surface of the light transmission member 3, which faces the scale 7. The function fluctuation of the aperture 32, because of the mounting displacement of the light transmission member 3, is therefore smaller than in the case where the aperture 32 is arranged at that surface of the light transmission member 3, which faces the light source (LED 2). For example, as the aperture 32 moves toward the photodetector 4, the light internally reflected can easily enter the PD array 41. As the aperture 32 moves away from the photodetector 4, it blocks the light required for detecting encoder signals, too, possibly decreasing the signal level. If the aperture 32 is arranged the upper surface of the light transmission member 3, which faces the scale 7, the light will diverge at a position remote from the LED 2 used as a light source. The aperture 32 therefore imposes, but a small influence on the position fluctuation. Note that the first grating 31 lies on that surface of the light transmission member 3, which faces the LED 2, and is therefore hardly influenced by position fluctuation of the aperture 32.

Since the aperture 32 is either circular or has at least one arcuate part, the angle of incidence of the light focused and reaching the light-transmitting resin layer 6 can be limited to a predetermined value or a smaller value. This prevents the stray light in the light-transmitting resin layer 6 (including the internally reflected light directly impinging on the photodetector 4 after being reflected at the surface of the light-transmitting resin layer 6) from decreasing the signal-to-noise ratio, or from leaking outside the encoder head.

The aperture 32 may be shaped to block the light that scarcely contributes to the detection of the encode signal. In this case, the stray light, in particular, can be prevented from emerging outside.

The light is thus blocked or prevented from reaching the sides of the light transmission member 3. This works well with the effect of the aperture 32, more readily preventing stray light than otherwise.

The encoder according to this embodiment is a reflecting type. In any reflecting encoder, the light-emitting and light-receiving units can be arranged on one side of the scale. The reflecting encoder can therefore be made thinner than a transmission encoder. The use of the aperture 32 prevents the internally reflected light from being reflected at the surface of the light-transmitting resin layer 6, and eliminates or reduces the influence of the other stray light. As a result, the light-transmitting resin layer 6, for example, can be made thinner. This helps to make the encoder thinner and smaller.

In the present embodiment, the optical components and electrical wiring of the encoder head are sealed in resin. With resin seal, the encoder is, of course, more reliable than in the case where the optical components and electrical wiring head are not sealed at all. Further, resin is material that can be produced at low cost and in large qualities. Still further, the encoder can produce a stable output, because the aperture 32 eliminates or reduces the influence of the other stray light. Especially, in the reflecting encoder, which is resin-sealed, the internally reflected light is likely to enter the light-receiving unit directly. The aperture 32 can serve as an effective means of solving this problem. In view of this, the combined use of the resin sealing and aperture 32 can be said to be useful for manufacturing the encoder at low cost and in large quantities.

Furthermore, the combined use of the resin sealing and aperture 32 can render the resin layer thinner. If the resin layer is thick, a large internal stress will act when the temperature changes during the manufacture or use of the encoder, warping the substrate, cracking the resin layer and distorting the mounted components. The warping of the substrate makes it hard to handle the components while the encoder is being manufactured, possibly changing the position or posture of each component during the assembling and impairing the characteristic or reliability of the encoder. These problems are solved, because the resin layer is made thinner by using the aperture.

In this embodiment, the relationship that the angle of reflection $\theta$ is greater than $\theta c$ (that is, $\theta > \theta c$) is set to the distance L longest from the light-emitting unit in the light-receiving area of the PD array 41. The light totally reflected at the surface of the light-transmitting resin layer 6 therefore impinges on at least a part of the PD array 41 if the light is not blocked at the aperture 32 of the light transmission member 3 and at that side of the light transmission member 3, which faces the PD array 41. Nevertheless, the totally reflected light imposes no influence or the influence of the totally reflected light is suppressed, because of the aperture 32 and the light blocking at that side of the light transmission member 3. The encoder can therefore achieve stable detection of signals, though it is thin.

First Modification of the First Embodiment

Configuration

Figure 3B:
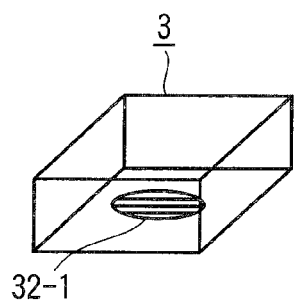

A first modification of the first embodiment described above will be described below. FIG. 3B shows the configuration of a light transmission member 3 according to the first modification. Except this component, the first modification is identical in configuration to the first embodiment. In the first modification, the pattern of the first grating 31 arranged on that surface of the light transmission member 3, which faces the LED 2, performs the function of an aperture 32-1. That surface of the light transmission member 3, which faces the scale 7, is not patterned at all. Further, that side of the light transmission member 3, which faces the photodetector 4, is shielded from light.

The shape of the aperture 32 is circular, having a radius R. Radius R is different from the value adopted in the first embodiment, but is determined by the above-mentioned conditions 1 to 3, as in the first embodiment. The aperture 32 is not limited to a circular one. It can have various shapes as in the first embodiment.

[Operation and Advantage]

In operation and advantage, the first modification is basically identical to the first embodiment. Since the first grating 31 and the aperture 32-1 share the same pattern, that surface of the light transmission member 3, which faces the scale 7, need not be patterned at all. In addition, the pattern of the aperture 32 is positioned closer to the LED 2 because it is arranged on that surface of the light transmission member 3, which faces the LED 2. The pattern of the aperture 32-1 can have the smallest size possible. This is useful, particularly when the components are mounted with high precision.

Second Modification of the First Embodiment

Configuration

Figure 3C:
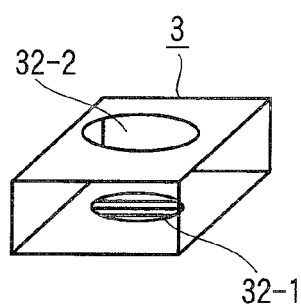

A second modification of the first embodiment described above will be described below. FIG. 3C shows the configuration of a light transmission member 3 according to the second modification. Except this component, the second modification is identical in configuration to the first embodiment. In the second modification of FIG. 3C, a function of an aperture 32-1 is added to the pattern of the first grating 31, which is arranged on that surface of the light transmission member 3, which faces the LED 2, as well as a second aperture 32-2 is made in that surface of the light transmission member 3, which faces the scale 7. Alternatively, the pattern of the first grating, which performs the function of an aperture, may be provided on that surface of the light transmission member 3, which faces the scale 7, and the second aperture may be arranged on that surface of the light transmission member 3, which faces the LED 2.

The sides of the photodetector 4 are shielded from light. The aperture 32-1 made in that surface of the light transmission member 3, which faces the LED 2, is circular and has radius R1. The aperture 32-2 made in that surface of the light transmission member 3, which faces the scale 7, is circular, too, and has radius R2. R2 is determined by the above-mentioned conditions 1 to 3, as in the first embodiment. R1 is smaller than R2, because the aperture 32-1 is made in the surface facing the LED 2. Nonetheless, R1 is determined more loosely than in the case it is set in the same way as R2. That is, R1 is a little larger than it should be.

The shapes of the apertures 32-1 and 32-2 are not limited to a circular one. They can have various shapes as in the first embodiment.

[Operation and Advantage]

Basically, the second modification operates in the same as the first embodiment and achieves the same advantage as the first embodiment. Nonetheless, it is different in operation and advantage, as described below, because two apertures 32-1 and 32-2 are used. At first, the first aperture 32-1 blocks most unnecessary part of the light coming from the LED 2 used as a light source. Next, the second aperture 32-2 blocks that part of the light, which may change to stray light. The part of the light, which may become stray light is thereby blocked at a position near the light-emitting unit (LED 2). This effectively prevents the occurrence of stray light, as is desired particularly when the components must be mounted with high precision.

If the LED 2 used as a light source has a large light emission window, the angle of incidence at which light impinges on the light-transmitting resin layer 6 cannot be decreased unless two apertures 32-1 and 32-2 are provided, since a single aperture achieves an insufficient aperture effect in some cases. The use of two apertures 32-1 and 32-2 can effectively reduce stray light efficiently even if the LED 2 used as a light source has a large light emission window.

The patterns of the first grating 31 and the patterns of the apertures 32-1 and 32-2 may be made of material having high reflectance, such as Cr. In this case, if the light that may become stray light at the aperture 32-1 that function as first grating 31 is not reduced, the light reflected below the first the pattern of the second aperture 32-2 will travel back to the first grating 31 and may produce stray light, or is reflected by the first grating 31 and guided though the proper detection optical path to the PD array 41. If detected by the PD array 41, this light may become a component that cancels the encoder signal. Thus, the two apertures 32-1 and 32-2 can work, effectively reducing the unnecessary light that reaches the apertures, also in the case they are made of material having high reflectance and patterned on the upper and lower surfaces of the light transmission member 3.

The effect of reducing stray light enables the encoder to produce an encoder signal of high signal-to-noise ratio and to achieve stable detection of signals.

Third Modification of the First Embodiment

Configuration

Figure 4:
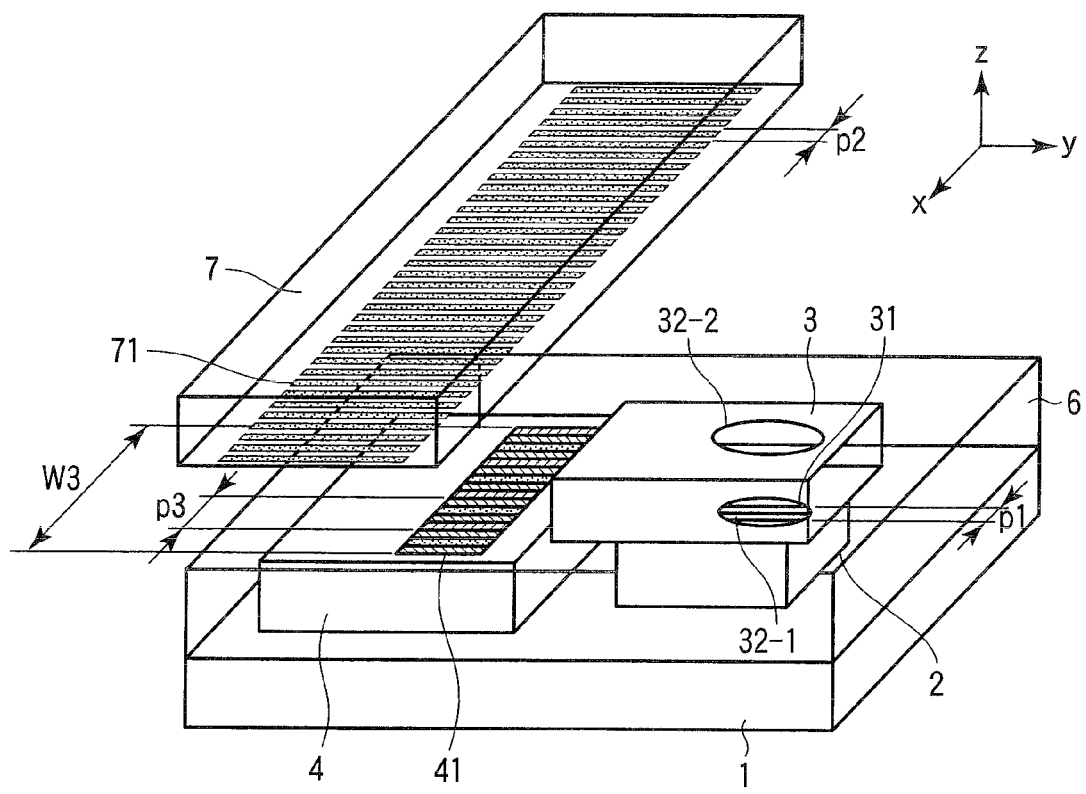
FIG. 4 is a diagram showing the configuration of the light transmission member of the third modification of the first embodiment.

FIG. 4 shows the configuration of a light transmission member 3 according to a third modification of the first embodiment. Except the light transmission member 3 and the light source, the third modification is identical in configuration to the second modification of the first embodiment.

In the configuration of FIG. 4, the light transmission member 3 is formed, extending long toward the photodetector 4, more precisely toward the PD array 41. Further, the light source is a molded surface-mounting LED. Two apertures 32-1 and 32-2 are circular, having radius R1 and radius R2, respectively. Radiuses R1 and R2 are determined in the same way as in the second modification. The shapes of the apertures 32-1 and 32-2 are not limited to a circular one. They can have various shapes as in the first embodiment.

[Operation and Advantage]

Basically, the third modification operates in the same way and achieves the same advantage, as the second modification of the first embodiment. In addition, the apertures can be positioned near the PD array 41, because the light transmission member 3 extends long toward the PD array 41. Thus, the apertures never block the light necessary for detecting signals. Moreover, the extending part of the light transmission member 3 can block light effectively. To be more specific, the extending part, which is long, can effectively block the light emerging from the sides of the LED 2. Similarly, the light transmission member 3 may be formed, extending in a direction parallel to the scale 7. Also in this case, the light transmission member 3 can block the light that may become stray light.

The use of two apertures 32-1 and 32-2 achieves the following function and advantage. At first, the first aperture 32-1 blocks most unnecessary part of the light coming from the LED 2 used as a light source. Next, the second aperture 32-2 blocks that part of the light, which may change to stray light. Thus, that part of the light, which may become stray light, is blocked at a position near the light-emitting unit (LED 2). This effectively prevents the occurrence of stray light, as is desired particularly when the components must be mounted with high precision.

If the LED 2 used as a light source has a large light emission window, the angle of incidence at which light impinges on the surface of the light-transmitting resin layer 6 cannot be decreased unless two apertures 32-1 and 32-2 are provided, since a single aperture achieves an insufficient aperture effect in some cases. The use of two apertures 32-1 and 32-2 can effectively reduce stray light efficiently even if the LED 2 used as a light source has a large light emission window.

The effect of reducing stray light enables the encoder to produce an encoder signal of high signal-to-noise ratio and to achieve stable detection of signals.

Fourth Modification of the First Embodiment

Configuration

Figure 5:
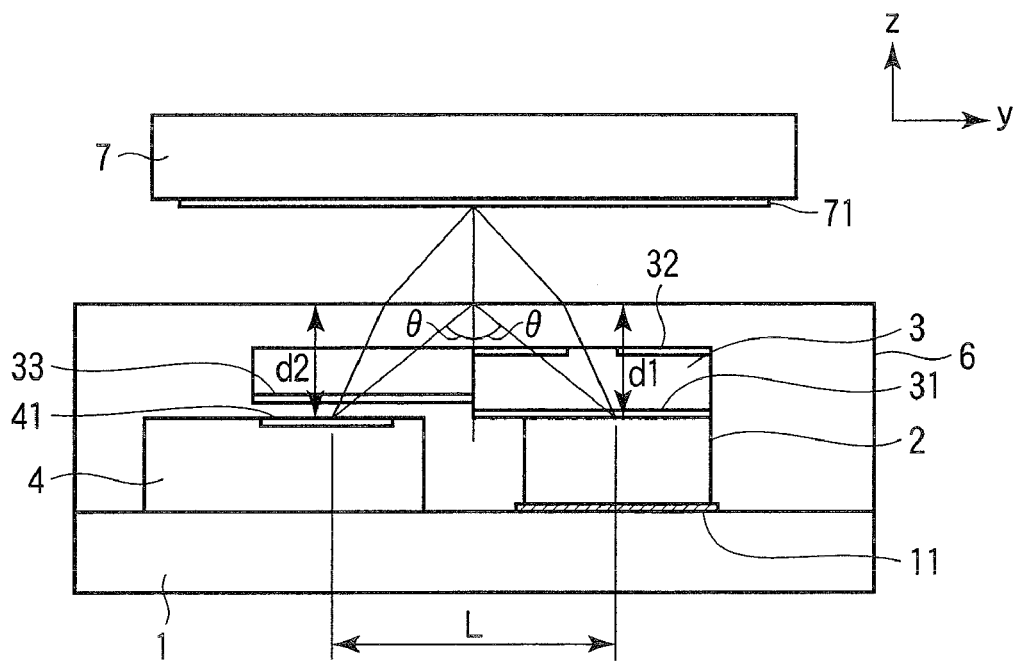
FIG. 5 is a diagram showing the configuration of the light transmission member of the fourth modification of the first embodiment.

FIG. 5 shows the configuration of a light transmission member 3 according to a fourth modification of the first embodiment. Except the light transmission member 3, the fourth modification is identical in configuration to the third modification of the first embodiment.

In the configuration of FIG. 5, the light transmission member 3 extends, arranging an aperture 33 with respect to the PD array 41 such that light transmission member 3 covers the PD array 41. A low steps is formed between the aperture 32 and the aperture 33 in terms of how they are positioned. The light transmission member 3 is mounted on the LED 2. The light transmission member 3 and the light-transmitting resin layer 6 have refractive indices, both being about 1.5. Hence, distances d1 and d2 are almost equal in terms of the refractive index of the light-transmitting resin layer 6. Note that the step may be eliminated by means of optical design, thereby making the LED 2 a little higher than the photodetector 4.

[Operation and Advantage]

Basically, the fourth modification operates in the same way and achieves the same advantage, as the second modification of the third modification. In addition, the extending part of the light transmission member 3 effectively blocks light. Thus, the light emitted from the sides of the LED 2 and internally reflected never impinges directly on the PD array 41. The light impinging on a region around the PD array 41 may be absorbed into the PD structure, producing a dark current that flows into the PD array 41. The dark current may become a noise component or produce an offset component for each 90° phase difference signal. Nevertheless, such a noise component or offset component can be suppressed by sealing the region around the PD array 41 from light. This effect of reducing stray light enables the encoder to produce an encoder signal of high signal-to-noise ratio and to achieve stable detection of signals.

Fifth Modification of the First Embodiment

Configuration

Figure 6:
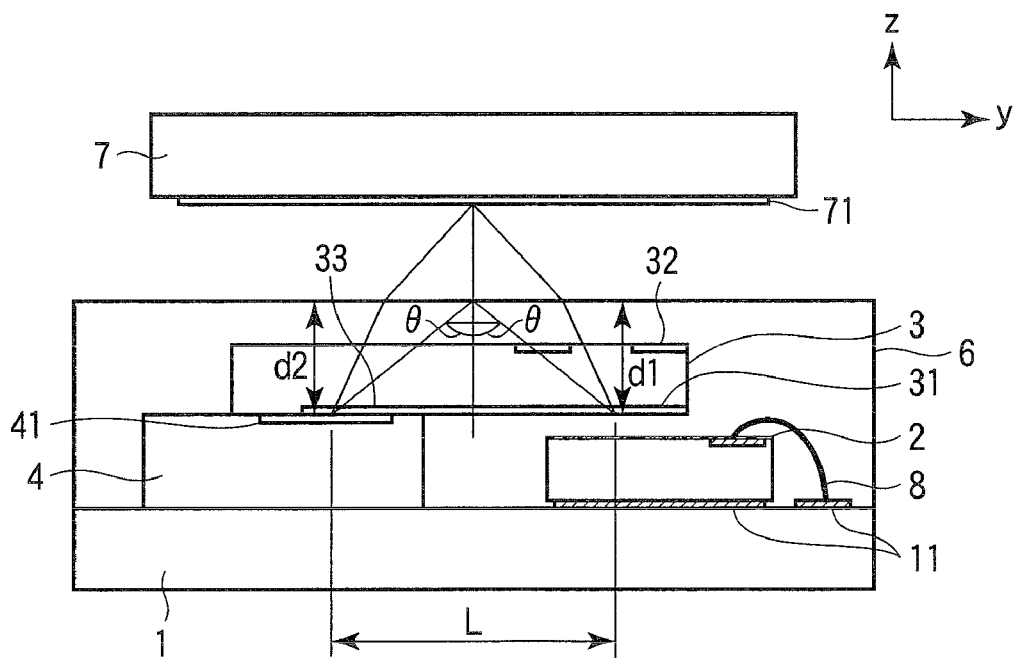
FIG. 6 is a diagram showing the configuration of the light transmission member of the fifth modification of the first embodiment.

FIG. 6 shows the configuration of a light transmission member 3 according to a fifth modification of the first embodiment. The fifth modification differs from the second modification of the first embodiment, only in that the light transmission member 3 is adhered (or mounted directly) to that surface of the photodetector 4, which faces the scale 7, more precisely to the surface of the PD array 41 of the photodetector 4 and extended toward the LED 2. That is, light transmission member 3 having the first grating 31 is adhered to the surface of the PD array 41 of the photodetector 4. Further, an aperture 33 is provided for the PD array 41.

[Operation and Advantage]

Basically, the fifth modification operates in the same way and achieves the same advantage, as the third modification of the first embodiment. Moreover, the extending part of the light transmission member 3 effectively blocks light. Thus, the light emitted from the sides of the LED 2 and internally reflected never impinges directly on the PD array 41.

The light impinging on a region around the PD array 41 may be absorbed into the PD structure, producing a dark current that flows into the PD array 41. The dark current may become a noise component or produce an offset component for each 90° phase difference signal. Nevertheless, such a noise component or offset component can be suppressed by sealing the region around the PD array 41 from light. This effect of reducing stray light enables the encoder to produce an encoder signal of high signal-to-noise ratio and to achieve stable detection of signals.

Further, the light transmission member 3 forming the first grating 31 is adhered to the PD array 41 of the photodetector 4. Therefore, the step between the first grating 31 and the third grating can be lower than in the case where the first grating 31 and the surface of the PD array 41, which is the third grating, are formed independently. The difference between the distance from the first grating 31 to the second grating 71 and the distance from the second grating 71 to the third grating can therefore be reduced. As a result, the magnification of the image of the second grating 71, formed on the third grating, more approaches the value of 2. Thus, the decrease in the detection signal level, which results from the magnification shift, can be reduced. In addition, the difference in the magnification, due to the change in the gap between the encoder head and the scale 7, can be reduced. The encoder is therefore resistant to gap changes, too.

Second Embodiment

Figure 7:
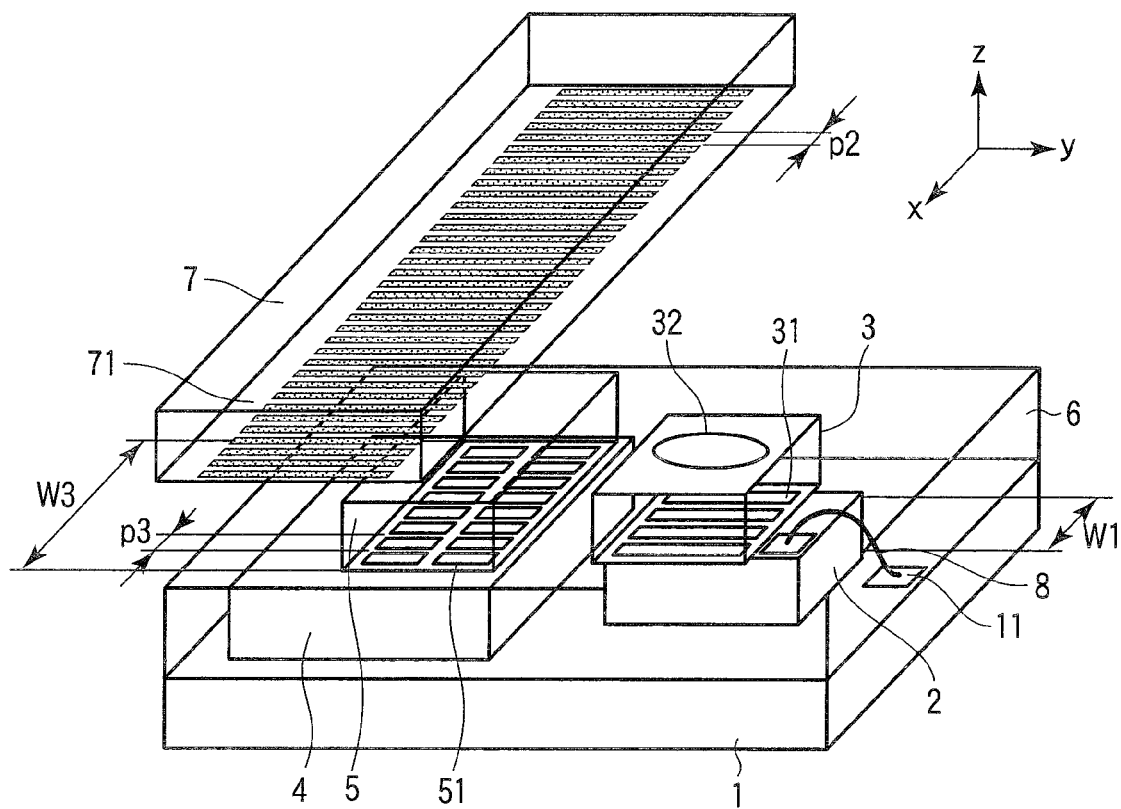
FIG. 7 is a perspective view of an optical encoder according to a second embodiment of the present invention.
Figure 8:
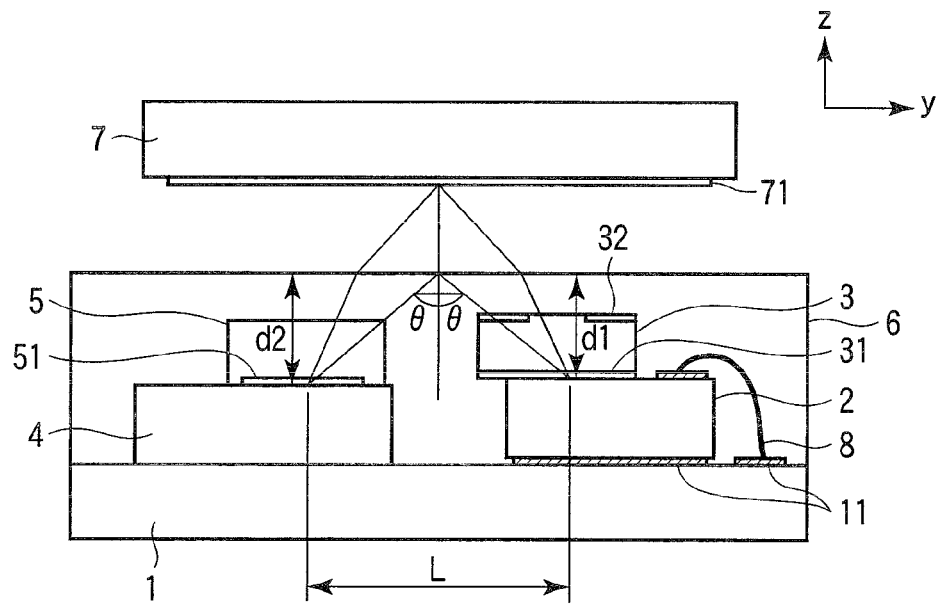
FIG. 8 is a sectional view of the optical encoder according to the second embodiment of this invention.

FIG. 7 is a perspective view of an optical encoder according to a second embodiment of the present invention, and FIG. 8 is a sectional view of this optical encoder. The second embodiment differs from the third modification of the first embodiment in that the photodetector 4 having the PD array 41 is replaced by a light-transmitting substrate 5 that has a photodetector 4 having four light-receiving units, and a third grating 51 having pitch p3.

The first grating 31, the second grating 71 and the third grating 51 are arranged in the x-direction, parallel to one another. Of the upper surface of the resin layer, at least that part through which the light emitted from the LED 2 used as a light source passes after reflected at the scale 7 to reach the photodetector is flat and formed parallel to the three gratings 31, 51 and 71. The scale 7 can make a relative motion in the x-direction only, with the second grating 71 kept parallel to the first grating 31 and third grating 51.

The substrate 1, bare LED 2, light transmission member 3, photodetector 4 and light-transmitting substrate 5 are shaped like flat plates and extend parallel to one another. The thickness tolerance for them is about ±20 μm or less. As shown in FIGS. 7 and 8, they are adhered directly on the substrate 1. The thickness tolerance for the adhesive layers bonding them together is about ±10 μm or less. Further, the light-transmitting resin layer 6 is so shaped that its upper surface is almost flat.

The third grating 51 is provided on one surface of the light-transmitting substrate 5. The third grating 51 is composed of four grating groups arranged in four regions defined by dividing the surface of the light-transmitting substrate 5 by 4. The grating groups have the same pitch p3, and each is staggered from the adjacent group by p3/4. Each grating group has an effective width W3, which is about half the width that the light-transmitting substrate 5 has in the direction the scale 7 can move. The third grating 51 is arranged to serve as that surface of the light-transmitting substrate 5, which faces the photodetector 4. The four grating groups correspond to the four light-receiving units of the photodetector 4, in a one-to-one relationship. The photodetector 4, at the four light-receiving units corresponding to each grating group, produces four signals that differ in phase, each having a phase difference of p3/4 with respect to the next signal.

The thickness of the encoder head will be explained. In the space between the light-emitting surface of the LED 2 and the surface of the light-transmitting resin layer 6, the light transmission member 3 has refractive index n1 and thickness t1, and the light-transmitting resin layer 6 has refractive index n2 and thickness t2. In the space between the surface of the light-transmitting resin layer 6 and the light-receiving surface of the photodetector 4, the light-transmitting resin layer 6 has refractive index n2 and thickness t5, and the light-transmitting substrate 5 has refractive index n4 and thickness t4. Note that the air layer between the head and the scale 7 has refractive index n3.

In terms of the refractive index of the light-transmitting resin layer, distance d1 from the light-emitting surface of the LED 2 and distance d2 from the surface of the transmitting resin layer 6 to the PD array 41 are defined as follows:

$$d1 = t1 \times n2/n1 + t2$$

$$d2 = t4 \times n2/n4 + t5$$

In this embodiment, the light transmission member 3 and the light-transmitting substrate 5 are made of the same material and have the same thickness. That is, t1=t4, and t2=t5.

Hence, d1 and d2 can be calculated from the following equation:

$$d1 = d2 = t1 \times n2/n1 + t2$$

It should be noted that the second embodiment can be modified in various manners and the components can be replaced, as in the first embodiment.

[Operation and Advantage]

The second embodiment operates in the same way and achieves the same advantage, as the third modification of the first embodiment. Moreover, it can provide a three-grating encoder without designing and producing a complicated PD array, by using, in place of a PD array, the photodetector 4 having four light-receiving units and the light-transmitting substrate 5 having the third grating 51.

Since the light transmission member 3 and the light-transmitting substrate 5 are made of the same material and have the same thickness, the LED 2 and the photodetector 4 can be made to have the same thickness. This can make distances d1 and d2 match each other with high precision. The decrease in the detection signal level, resulting from the magnification shift, can be reduced. In addition, the decrease in the signal level, which results from the change in magnification, can be reduced. Moreover, the change in magnification, which results from the change in the gap between the encoder head and the scale 7, can be reduced. The encoder is therefore resistant to gap changes, too.

Modification of the Second Embodiment

Configuration

Figure 9:
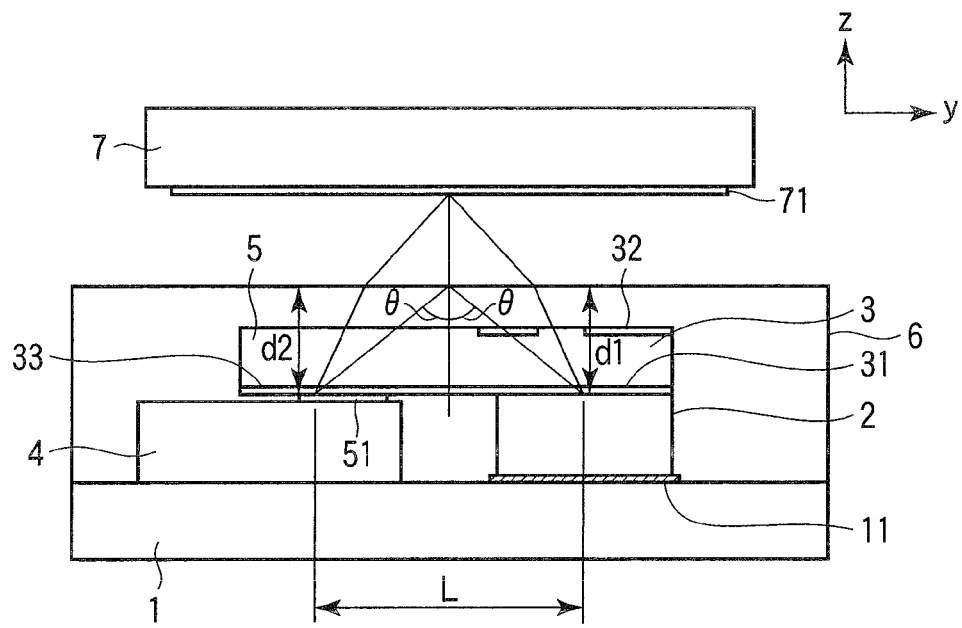
FIG. 9 is a diagram showing the configuration of a modification of the optical encoder according to the second embodiment.
Figure 10:
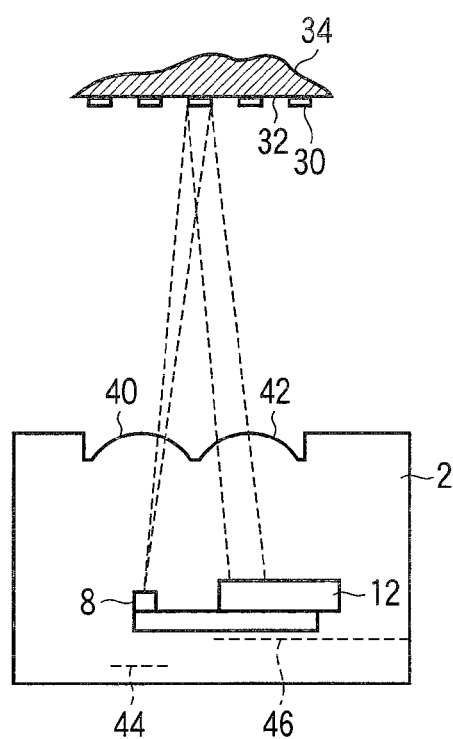
FIG. 10 is a diagram showing the configuration of a conventional optical encoder.

FIG. 9 shows the configuration of an optical encoder according to a modification of the first embodiment. As shown in FIG. 9, the light-transmitting substrate 5 is formed integral with the light transmission member 3. The light transmission member 3 is arranged parallel to the second grating 71. A gap, if any between the light transmission member 3 and the LED 2 or photodetector 4, is filled with adhesive. The step between the first grating 31 and the third grating 51 can therefore be small.

[Operation and Advantage]

Basically, the modification of the second embodiment operates in the same way and achieves the same advantage, as the second embodiment. Since the step between the first grating 31 and the third grating 51 is smaller than in the second embodiment, the decrease in the signal level, which results from the change in magnification, can therefore be more reduced than in the second embodiment. In addition, since the change in magnification, which results from the change in the gap between the encoder head and the scale 7, can be reduced, the encoder can be resistant to gap changes, too.

What is claimed is:

1. An optical encoder comprising:
an encoder head secured to one of a fixed member and a movable member which move relative to each other; and
a scale secured to the other of the fixed member and movable member, facing the encoder head and having a second grating that has an optical pattern of a predetermined pitch, wherein:
the encoder head has a light emission unit configured to emit specific light to the scale, a light transmission member configured to transmit the light emitted from the light emission unit and a light detection unit having light detection elements arranged at a predetermined pitch;
the light transmission member has a first grating having an optical pattern of a predetermined pitch and an aperture configured to narrow the light emitted from the light emission unit and impinging on the second grating of the scale; and
a motion of an image on the light detection elements of the light detection unit is detected, the image being formed by the light reflected or diffracted by the second grating of the scale after the light emitted from the light emission unit impinges on the scale through the light transmission member.

2. The optical encoder according to claim 1, wherein the first grating is formed on one of two surfaces of the light transmission member, one of which faces the light emission unit and the other of which faces the scale, and a pattern of the aperture is formed on the other surface of the light transmission member.

3. The optical encoder according to claim 2, wherein the first grating is formed on that surface of the light transmission member, which faces the light emission unit, and the pattern of the aperture is formed on that surface of the light transmission member, which faces the scale.

4. The optical encoder according to claim 1, wherein the pattern of the first grating functions as the aperture.

5. The optical encoder according to claim 4, wherein the optical pattern of the first grating is formed on one of the two surfaces of the light transmission member, one of which faces the light emission unit and the other of which faces the scale, and functions as the aperture, and a pattern of a second aperture is formed on the other surface of the light transmission member.

6. The optical encoder according to claim 1, wherein the light transmission member is mounted directly on that surface of the light emission unit, which faces the scale.

7. The optical encoder according to claim 1, wherein the light transmission member is mounted directly on that surface of the light detection unit, which faces the scale.

8. The optical encoder according to claim 1, wherein the pattern of the aperture is circular or at least part of the pattern is arcuate.

9. The optical encoder according to claim 1, wherein a light transmission hindering unit is provided on at least parts of the sides of the light transmission member.

10. The optical encoder according to claim 1, wherein the pattern of the aperture is formed on that surface of the light transmission member, which faces the scale.

11. The optical encoder according to claim 1, wherein the pattern of the aperture is formed on that surface of the light transmission member, which faces the light emission unit.

12. The optical encoder according to claim 1, wherein the optical encoder is a reflecting type.

13. The optical encoder according to claim 1, wherein those surfaces of the light emission unit and light detection unit, which face the scale, are entirely covered by a second light transmission member.

14. The optical encoder according to claim 1, wherein those surfaces of the light emission unit and light detection unit, which face the scale, are entirely covered by a second light transmission member; the upper surface of the second light emission member, which faces the scale, is almost flat; and the following relation is satisfied in terms of the distance converted assuming that the refractive indices of intervening light transmission members such as the first light transmission member are the same as that of the second light transmission member:

$$\mathrm{ArcTan}\{L/(t1+t2)\} \geq \mathrm{ArcSin}(n1/n2)$$

where t1 is the distance from the light emission unit to the surface of the second light transmission member, t2 is the distance from the light detection unit to the surface of the second light transmission member, L is a component of the longest distance between the light emission unit and the light detection unit, the component being parallel to the surface of the scale, n1 is the refractive index outside the encoder, and n2 is the refractive index of the light transmission member.

15. The optical encoder according to claim 1, wherein the light transmission member extends toward the light detection unit.

16. An optical encoder comprising:
an encoder head secured to one of a fixed member and a movable member which move relative to each other; and
a scale secured to the other of the fixed member and movable member, facing the encoder head and having a second grating that has an optical pattern of a predetermined pitch, wherein:
the encoder head has a light emission unit configured to emit specific light to the scale, a light transmission member configured to transmit the light emitted from the light emission unit and a light detection unit that has a third grating having an optical pattern of a predetermined pitch;
the light transmission member has a first grating having an optical pattern of a predetermined pitch and an aperture configured to narrow the light emitted from the light emission unit and impinging on the second grating of the scale; and
a motion of an image on the third grating of the light detection unit is detected, the image being formed by the light reflected or diffracted by the second grating of the scale after the light emitted from the light emission unit impinges on the scale through the light transmission member.

17. The optical encoder according to claim 16, wherein the first grating is formed on one of two surfaces of the light transmission member, one of which faces the light emission unit and the other of which faces the scale, and a pattern of the aperture is formed on the other surface of the light transmission member.

18. The optical encoder according to claim 17, wherein the first grating is formed on that surface of the light transmission member, which faces the light emission unit, and the pattern of the aperture is formed on that surface of the light transmission member, which faces the scale.

19. The optical encoder according to claim 16, wherein the pattern of the first grating functions as the aperture.

20. The optical encoder according to claim 19, wherein the optical pattern of the first grating is formed on one of the two surfaces of the light transmission member, one of which faces the light emission unit and the other of which faces the scale, and functions as the aperture, and a pattern of a second aperture is formed on the other surface of the light transmission member.

21. The optical encoder according to claim 16, wherein the light transmission member is mounted directly on that surface of the light emission unit, which faces the scale.

22. The optical encoder according to claim 16, wherein the light transmission member is mounted directly on that surface of the light detection unit, which faces the scale.

23. The optical encoder according to claim 16, wherein the pattern of the aperture is circular or at least part of the pattern is arcuate.

24. The optical encoder according to claim 16, wherein a light transmission hindering unit is provided on at least parts of the sides of the light transmission member.

25. The optical encoder according to claim 16, wherein the pattern of the aperture is formed on that surface of the light transmission member, which faces the scale.

26. The optical encoder according to claim 1, wherein the pattern of the aperture is formed on that surface of the light transmission member, which faces the light emission unit.

27. The optical encoder according to claim 16, wherein the optical encoder is a reflecting type.

28. The optical encoder according to claim 16, wherein those surfaces of the light emission unit and light detection unit, which face the scale, are entirely covered by a second light transmission member.

29. The optical encoder according to claim 16, wherein those surfaces of the light emission unit and light detection unit, which face the scale, are entirely covered by a second light transmission member; the upper surface of the second light transmission member, which faces the scale, is almost flat; and the following relation is satisfied in terms of the distance converted assuming that the refractive indices of intervening light transmission members such as the first light transmission member are the same as that of the second light transmission member:

$$\mathrm{ArcTan}\{L/(t1+t2)\} \geq \mathrm{ArcSin}(n1/n2)$$

where t1 is the distance from the light emission unit to the surface of the second light transmission member, t2 is the distance from the light detection unit to the surface of the second light transmission member, L is a component of the longest distance between the light emission unit and the light detection unit, the component being parallel to the surface of the scale, n1 is the refractive index outside the encoder, and n2 is the refractive index of the light transmission member.

30. The optical encoder according to claim 16, wherein the light transmission member extends toward the light detection unit.

* * * * *